(12) United States Patent
Nakagawa

(10) Patent No.: US 8,823,700 B2
(45) Date of Patent: Sep. 2, 2014

(54) OBJECT OPERATION DEVICE, METHOD, AND COMPUTER-READABLE STORAGE MEDIUM STORING OBJECT OPERATION PROGRAM

(75) Inventor: Machiko Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 13/248,504

(22) Filed: Sep. 29, 2011

(65) Prior Publication Data

US 2012/0081365 A1 Apr. 5, 2012

(30) Foreign Application Priority Data

Oct. 4, 2010 (JP) ................................. 2010-225243

(51) Int. Cl.
*G06T 15/00* (2011.01)
*G06T 17/20* (2006.01)
*G06T 17/00* (2006.01)
*G06F 3/0481* (2013.01)
*G06T 19/20* (2011.01)

(52) U.S. Cl.
CPC ............ *G06T 19/20* (2013.01); *G06F 3/04815* (2013.01); *G06T 2219/2016* (2013.01)
USPC ............................. 345/419; 345/423; 345/424

(58) Field of Classification Search
CPC .............. G06T 19/20; G06T 2200/24; G06T 2219/2021; G06T 2210/21; G06T 15/08; G06T 13/40; G06T 19/00; G06T 17/20; G06T 17/00; G06T 15/10; G06T 15/00; G06T 11/00; G06F 3/0485; G06F 1/1626; G06F 1/1694; G09G 2320/0261; G07F 17/32; G07F 17/3211; G07F 17/3202

USPC .................................................. 345/419, 672
See application file for complete search history.

(56) References Cited

U.S. PATENT DOCUMENTS

| | | | | |
|---|---|---|---|---|
| 6,421,048 | B1 * | 7/2002 | Shih et al. | 345/419 |
| 6,657,627 | B1 * | 12/2003 | Wada et al. | 345/473 |
| 8,012,006 | B2 * | 9/2011 | Koganezawa et al. | 463/7 |
| 2006/0258444 | A1 * | 11/2006 | Nogami et al. | 463/30 |

FOREIGN PATENT DOCUMENTS

| JP | 9-167256 A | 6/1997 |
|---|---|---|
| JP | 10-232943 A | 9/1998 |

OTHER PUBLICATIONS

Japanese Office Action mailed May 13, 2014 for corresponding Japanese Patent Application No. 2010-225243, with Partial English Translation, 5 pages.

* cited by examiner

*Primary Examiner* — Kee M Tung
*Assistant Examiner* — Nicole Gillespie
(74) *Attorney, Agent, or Firm* — Fujitsu Patent Center

(57) ABSTRACT

An object operation device for operating an object displayed on a display device, the object operation device includes a coordinate system generation unit that generates a local coordinate system for each of a plurality of points set around a reference object that is a reference of an operation when a target object is moved three-dimensionally by the operation, a move destination coordinates calculation unit that calculates move destination coordinates of the target object corresponding to a move command value of the target object inputted through an input device based on the local coordinate system of each of the generated plurality of points, and a moving process unit that moves the target object to the calculated move destination coordinates.

10 Claims, 16 Drawing Sheets

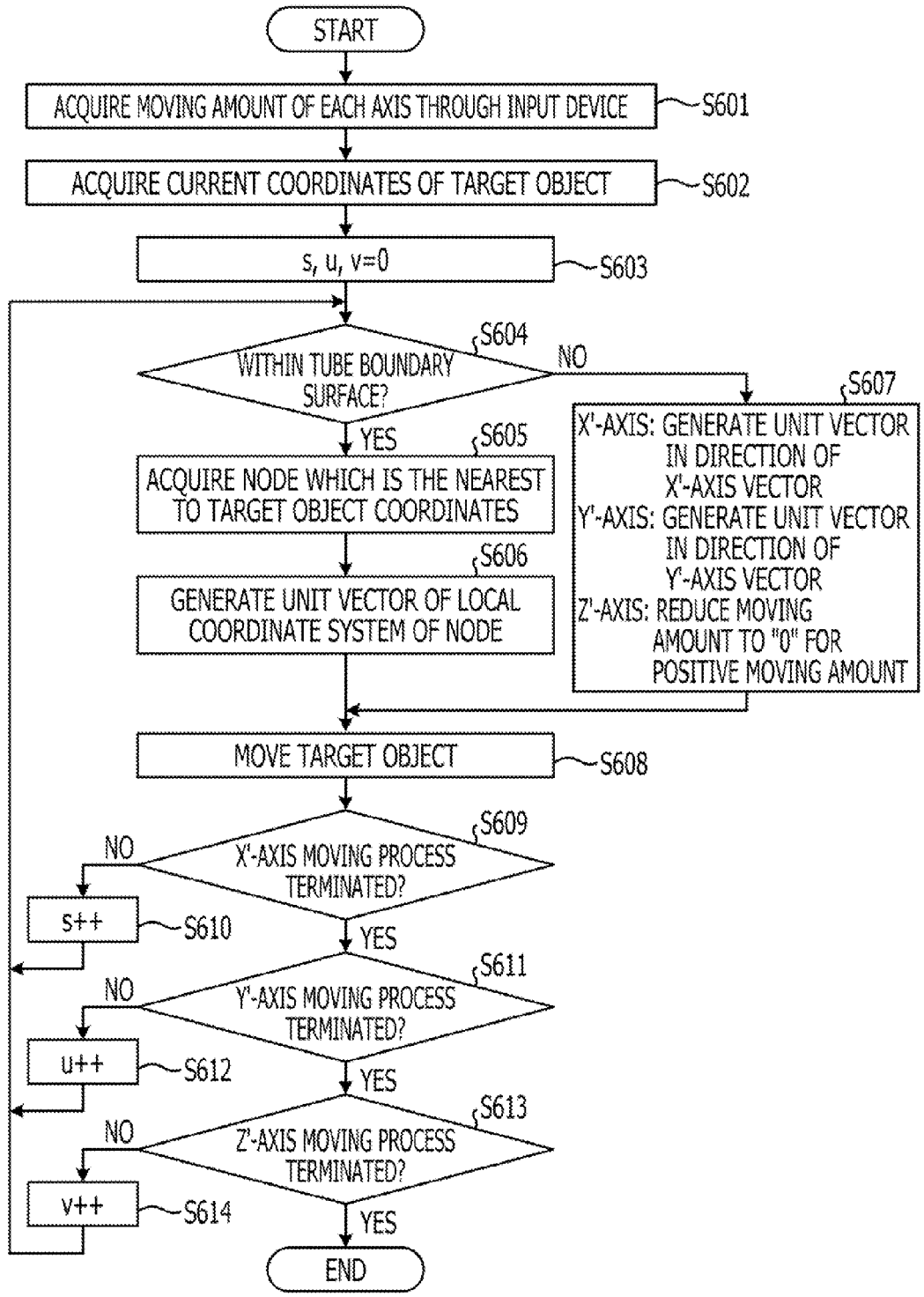

OBJECT OPERATION DEVICE, METHOD, AND COMPUTER-READABLE STORAGE MEDIUM STORING OBJECT OPERATION PROGRAM

CROSS-REFERENCE TO RELATED APPLICATIONS

This application is based upon and claims priority to prior Japanese Patent Application No. 2010-225243 filed on Oct. 4, 2010 in the Japan Patent Office, the entire contents of which are incorporated herein by reference.

FIELD

The embodiments discussed herein relate to an object operation device, an object operation method, and a computer-readable storage medium for storing an object operation program.

BACKGROUND

It has been conventional to operate an object (hereinafter, referred to as a "target object") which is displayed on a two-dimensional screen of a display device to three-dimensionally move the target object using an input device such as a mouse or the like. An operation of three-dimensionally moving the target object is applied when an observed object (hereinafter, referred to as a "reference object") is observed from various positions, for example, by using a virtual camera as a target object. That is, the reference object is allowed to be viewed from various positions by moving three-dimensionally the virtual camera around or within the reference object and by changing the view point position.

When a target object is to be operated to move three-dimensionally by a two-dimensional input device such as a mouse or the like, it is known to operate the target object to move by using two screens of an x-y plane and an x-z plane, for example. In the above operation, the target object is displayed respectively on the x-y plane and the x-z plane, and the target object is operated to move two-dimensionally first on the x-y plane and to move two-dimensionally then on the x-z plane thereby to realize a three-dimensional moving operation.

The method described above is suited to accurately operate a target object. However, since the target object is operated on two screens, the operation amount may be greatly increased and the time taken for the operation may increase in particular when a target object is to be operated so as to move complicatedly.

On the other hand, it is known to generate a local coordinate system around a reference object and to determine a path for movement of a target object so as to move the target object along the path according to the moving amount of a mouse. It is allowed to operate the target object to move three-dimensionally with a relatively small operation amount by this method.

However, the degree of freedom of three-dimensional movement of a target object may be restricted sometimes in related art.

That is, since the related art operates the target object to move simply along a path for movement that has been set and fixed in advance, it may be difficult for the related art to move the target object to a position deviating from the path. Therefore, it may be difficult for the related art to observe the reference object from various positions by three-dimensionally moving the target object to an arbitrary position around or within the reference object on a two-dimensional screen.

A technique disclosed herein has been made in view of the above mentioned circumstances and aims to provide an object operation device, an object operation method, and a computer-readable storage medium for storing an object operation program that allow the degree of freedom of three-dimensional movement of a target object to increase by a simple operation.

[Patent Document 1] Japanese Laid-open Patent Publication No. 10-232943

SUMMARY

According to an aspect of the invention, an object operation device for operating an object displayed on a display device, the object operation device includes a coordinate system generation unit that generates a local coordinate system for each of a plurality of points set around a reference object that is a reference of an operation when a target object is moved three-dimensionally by the operation, a move destination coordinates calculation unit that calculates move destination coordinates of the target object corresponding to a move command value of the target object inputted through an input device based on the local coordinate system of each of the generated plurality of points, and a moving process unit that moves the target object to the calculated move destination coordinates.

The object and advantages of the invention will be realized and achieved by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 16 illustrates an example flowchart of a process of calculating the coordinates of a move destination of a virtual endoscope.

DESCRIPTION OF EMBODIMENTS

Next, embodiments of an object operation device, an object operation method and a computer-readable storage medium for storing an object operation program that the present application discloses will be described in detail with reference to the accompanying drawings. Incidentally, techniques disclosed herein are not limited by the embodiments which will be described hereinafter.

Embodiments

Figure 1:
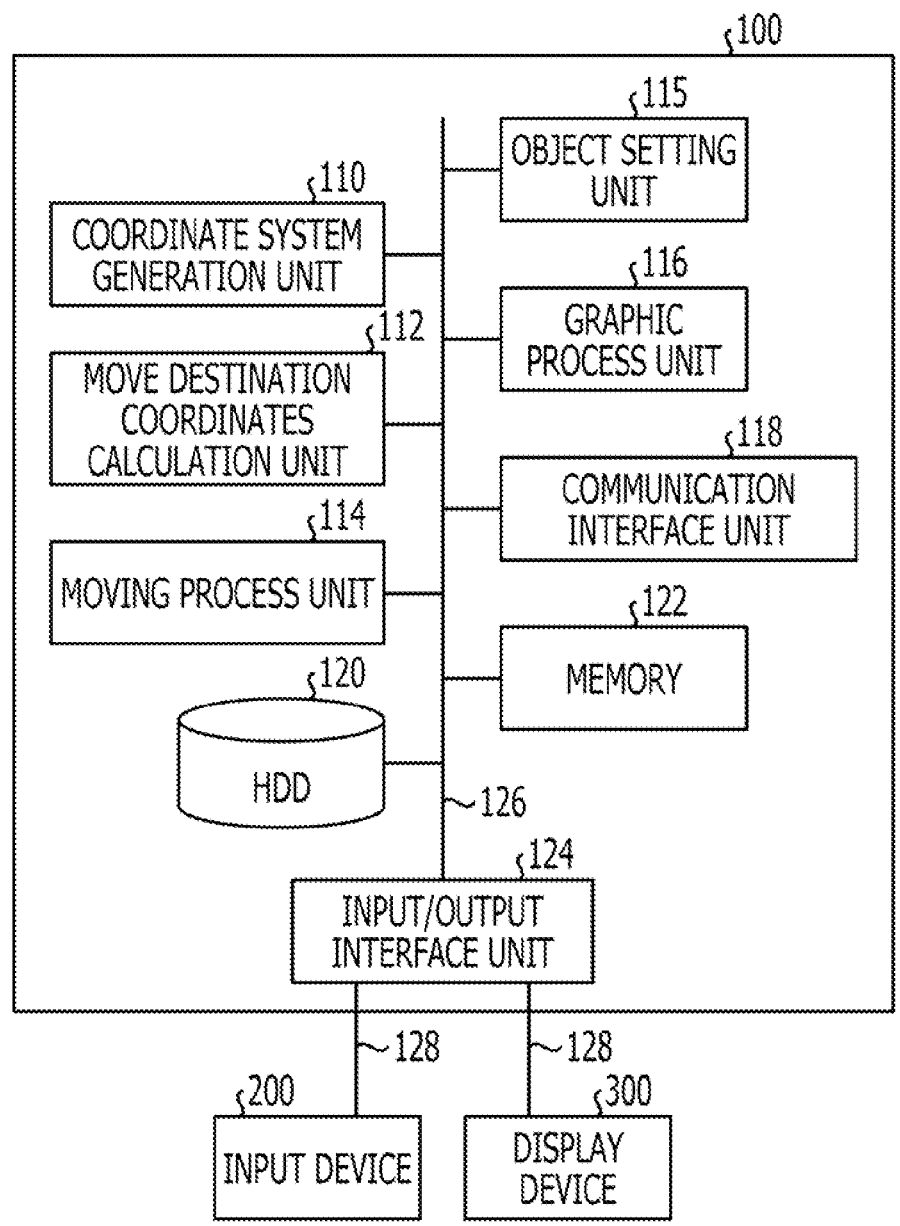
FIG. 1 illustrates an example general configuration of an object operation device according to an embodiment of the present invention.

FIG. 1 illustrates an example general configuration of an object operation device according to an embodiment. As illustrated in FIG. 1, an object operation device 100 includes a coordinate system generation unit 110, a move destination coordinates calculation unit 112, a moving process unit 114, and an object setting unit 115. The object operation device 100 also includes a graphic process unit 116, a communication interface unit 118, a hard disk drive (HDD) 120, a memory 122, and an input/output interface unit 124. The coordinate system generation unit 110, the move destination coordinates calculation unit 112, the moving process unit 114, the object setting unit 115, the graphic process unit 116, the communication interface unit 118, the HDD 120, the memory 122 and the input/output interface unit 124 are connected with one another via a communication bus 126. In addition, an input device 200 and a display device 300 are connected with the object operation device 100 via communication cables 128.

The coordinate system generation unit 110 generates a local coordinate system for each of a plurality of points set around a reference object that serves as a reference when a target object is to be target to move three-dimensionally. The move destination coordinates calculation unit 112 calculates the coordinates of a move destination of the target object that corresponds to a move command value of the target object which is input through the input device 200 based on the local coordinate system for each of the plurality of points that the coordinate system generation unit 110 has generated. The moving process unit 114 moves the target object to the move destination coordinates that the move destination coordinates calculation unit 112 has calculated. The object setting unit 115 sets the target object and also sets the reference object. Details of the coordinate system generation unit 110, the move destination coordinates calculation unit 112, the moving process unit 114 and the object setting unit 115 will be described later.

The graphic process unit 116 displays the target object and the reference object on the display device 300 and also displays an image that a virtual camera or a virtual endoscope takes in a direction of its line of sight when the target object is the virtual camera or the virtual endoscope. The communication interface unit 118 is an interface for wire communications or radio communications of the object operation device 100 with another device. The HDD 120 and the memory 122 are storage media that store an object operation program that the object operation device 100 executes, other various software programs, and data used in execution of the object operation program and various software programs. The input/output interface unit 124 is an input interface for various commands which are input through the input device 200 and an output interface that outputs image data to be displayed on the display device 300 to the display device 300.

Figure 2:
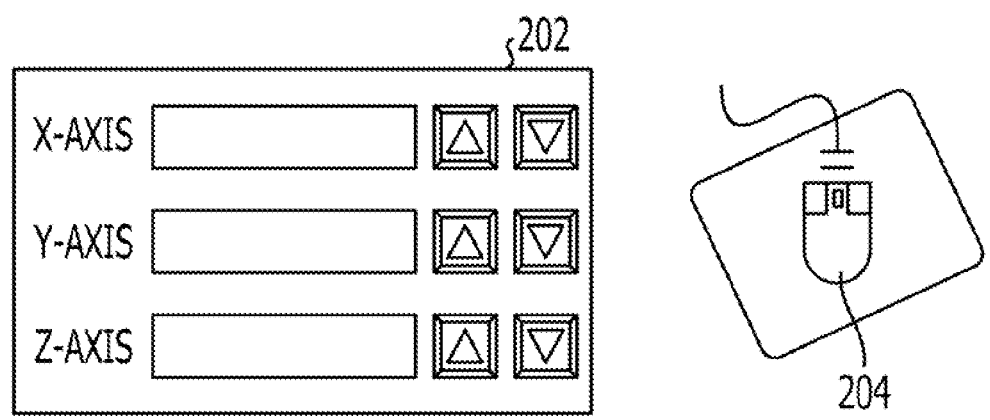
FIG. 2 illustrates an example of an input device.

The input device 200 may include various types of input devices, each inputting a command value for three-dimensionally moving the target object. The display device 300 may be a two-dimensional display device that displays various images that the graphic process unit 116 has generated. FIG. 2 illustrates an example of the input device 200. As illustrated in FIG. 2, it is allowed to display an image for operation 202 on the display device 300 so as to input the moving amount of each of an X-axis, a Y-axis and a Z-axis using an input device such as a keyboard or the like. In addition, it is allowed to input the moving amount of each of the X-axis, the Y-axis and the Z-axis using a mouse 204. When the target object is to be three-dimensionally operated using the mouse 204, an inputting method is set in advance for each of the X-axis, the Y-axis and the Z-axis so as to input the moving amounts of the X-axis, the Y-axis and the Z-axis independently of one another. For example, the object may be set to move in the X-axis direction by dragging while left-clicking the mouse 204, to move in the Y-axis direction by dragging while right-clicking the mouse 204, and to move in the Z-axis direction by dragging while center-wheel-clicking the mouse 204.

Figure 3:
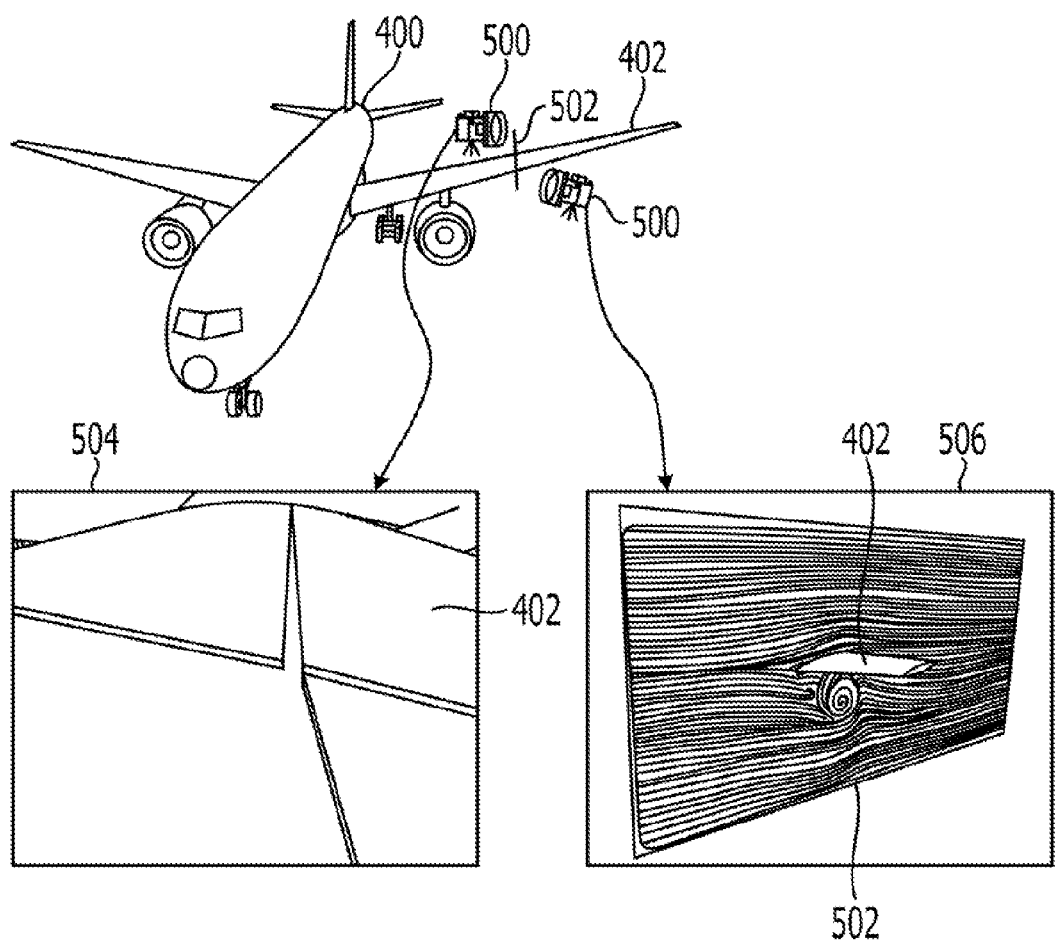
FIG. 3 illustrates an observation example of a main wing when a reference object is an airplane and a target object is a virtual camera.

FIG. 3 illustrates an observation example of a main wing when the reference object is an airplane and the target object is a virtual camera. The embodiment is an example in which the reference object is an airplane 400 and the target object is a virtual camera 500 as illustrated in FIG. 3. However, the embodiment is not limited to the above example and a virtual object to be observed by the virtual camera 500 may be arbitrarily set as the reference object. In addition, the target object is not limited to the virtual camera 500 and a virtual object which is operated to move three-dimensionally around or within the reference object such as, for example, illumination that illuminates the reference object may be arbitrarily set as the target object.

As illustrated in FIG. 3, it is allowed to display an observed image 504 of the main wing 402 taken in the direction of the line of sight from the virtual camera 500 on the display device 300 while operating the virtual camera 500 so as to move three-dimensionally around a main wing 402. In the above mentioned case, the virtual camera 500 displays the observed images 504 of the main wing 402 which are taken at various angles and distances while moving three-dimensionally around the main wing 402. For example, it is allowed to observe the main wing 402 from various directions while turning the virtual camera 500 on an orbit which is separated from the main wing 402 by a fixed distance. In addition, it is allowed to observe a specific part of the main wing 402 in detail or to observe the entire of the main wing 402 by moving the virtual camera 500 in a direction that it comes near or goes away from the main wing 402 off the orbit. Further, it is allowed to analyze the flow of a fluid such as air or the like for the main wing 402 by a fluid analysis tool and display an analyzed image 506 on the display device 300 while operating the virtual camera 500 so as to move three-dimensionally around the main wing 402 as illustrate in FIG. 3. A result of analysis of the flow of the air on a section 502 of the main wing 402 is displayed on the display device 300 as illustrated in FIG. 3.

Figure 4:
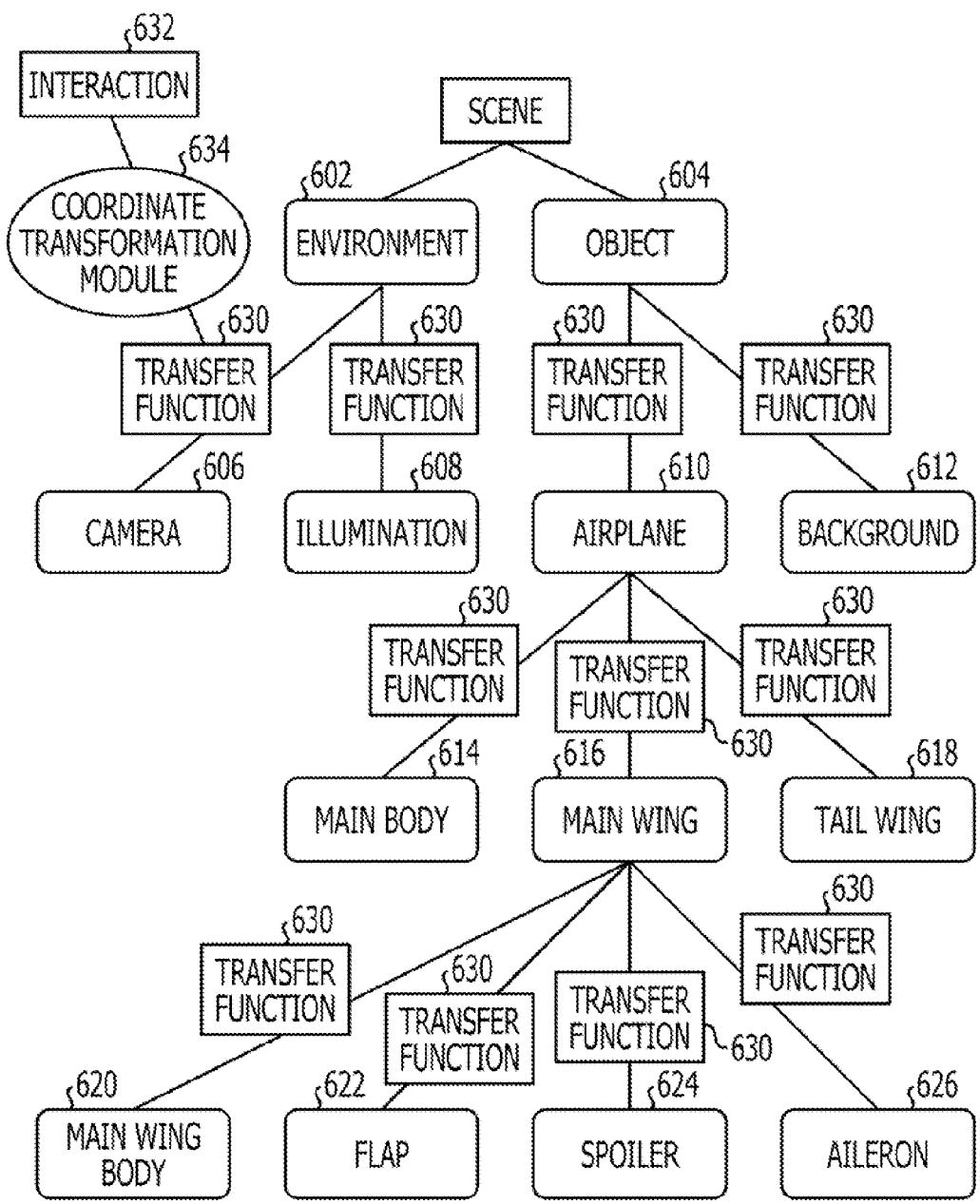
FIG. 4 illustrates an example of a scene graph.

FIG. 4 is a diagram illustrating an example of a scene graph. A scene graph has a tree structure which may materialize a concept for managing a displaying object in visualizing a reference object while operating the virtual camera 500 to move and is used by the developer of the object operation device 100. In the scene graph, a lump of information on a camera, illumination, an airplane and the like is called an object and a parent object and a child object are connected together subordinately. For example, if an environment 602 is the parent object, a camera 606 and illumination 608 will serve as the child objects. If an object 604 is the parent object, an airplane 610 and a background 612 will serve as the child objects. If the airplane 610 is the parent object, a main body 614, a main wing 616 and a tail wing 618 will serve as the child objects. If the main wing 616 is the parent object, a main wing body 620, a flap 620, a spoiler 624 and an aileron 626 will serve as the child objects.

An operation performed on the parent object influences the child objects, for example, such that the positions of the main body 614, the main wing 616 and the tail wing 618 change with changing the position of the airplane 610. Therefore, the parent object and each of the child objects are connected together via a transfer function 630 (a coordinate transformation function) and the position coordinates of another object change with changing the position coordinates of one object. In addition, in the scene graph, it is allowed to give an interaction 632 such as a position operation command per object. It is allowed to virtually give a local coordinate system to an arbitrary object by inserting a coordinate transformation module 634 between the transfer function 630 and the interaction 632. In the embodiment, it is allowed to give a local coordinate system to the camera 606 which is a target object simply by inserting the coordinate transformation module 634 between the interaction 632 and the transfer function 630 of the camera 606. Details of the local coordinate system will be described later.

Figure 5:
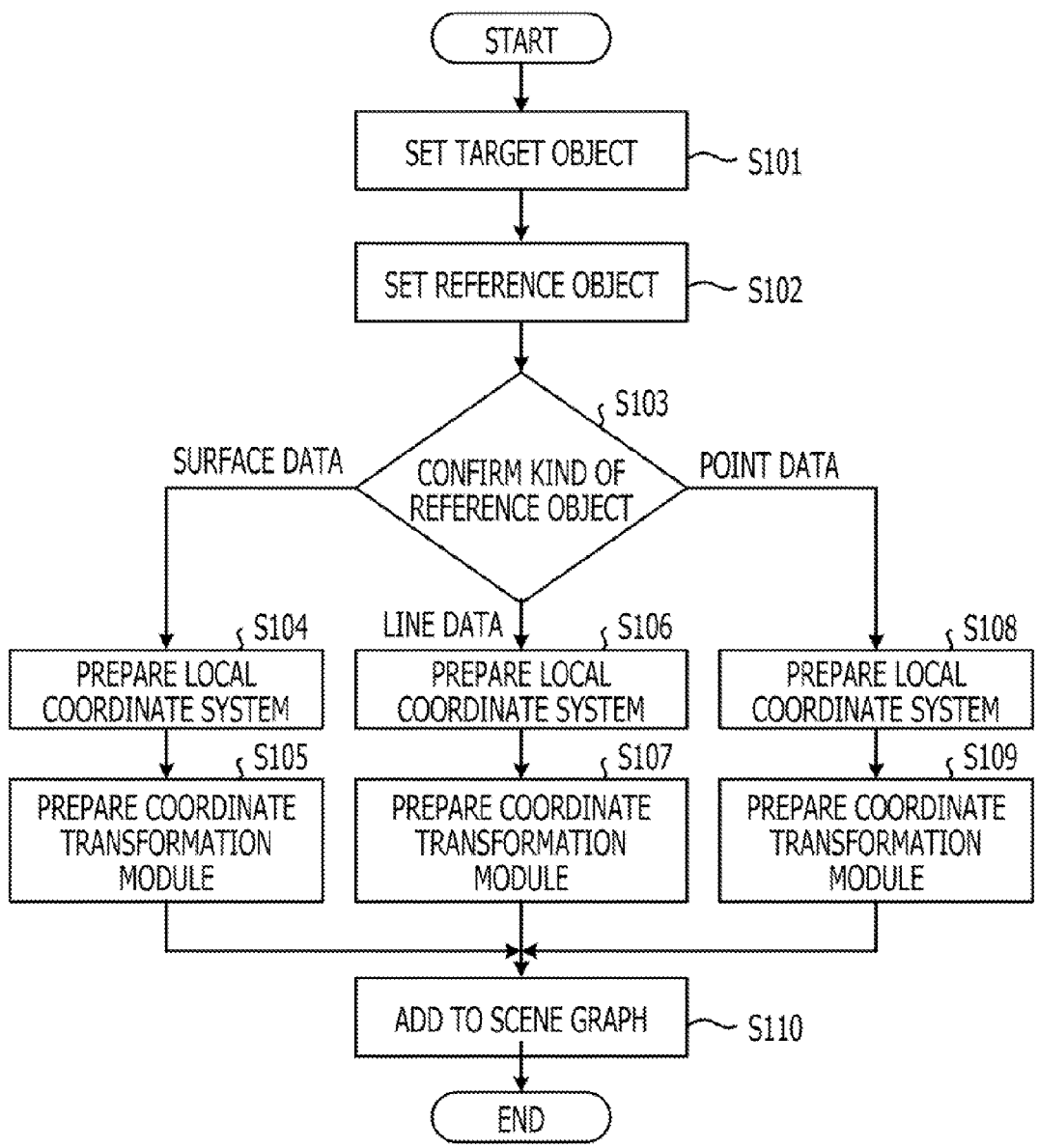
FIG. 5 illustrates an example flowchart of a general process of an object operation method.

FIG. 5 illustrates an example flowchart of the entire process of an object operation method. First, the object setting unit 115 sets a target object (S101). Specifically, the object setting unit 115 sets an object that has been selected from objects displayed on the display device 300 via the input device 200 in a target object setting mode as the target object. Here, it is supposed that the virtual camera 500 has been selected and set as the target object. Then, the object setting unit 115 sets a reference object (S102). Specifically, the object setting unit 115 sets an object which has been selected from objects displayed on the display device 300 via the input device 200 in a reference object setting mode as the reference object. Here, it is supposed that the airplane 400 has been selected and surface data of the airplane 400 has been set as the reference object.

Next, the coordinate system generation unit 110 confirms whether the kind of the set reference object is surface data, line data or point data (S103). Since the kind of the reference object is the surface data in this embodiment, the coordinate system generation unit 110 generates a local coordinate system for the surface data (S104). Then, the move destination coordinates calculation unit 112 prepares a coordinate transformation module for the surface data (S105). Then, the move destination coordinates calculation unit 112 adds the prepared coordinate transformation module to the scene graph (S110). Incidentally, when the reference object is the line data, the coordinate system generation unit 110 generates a local coordinate system for the line data (S106) and the move destination coordinates calculation unit 112 prepares a coordinate transformation module for the line data (S107). When the reference object is the point data, the coordinate system generation unit 110 generates a local coordinate system for the point data (S108) and the move destination coordinates calculation unit 112 prepares a coordinate transformation module for the point data (S109).

Figure 6:
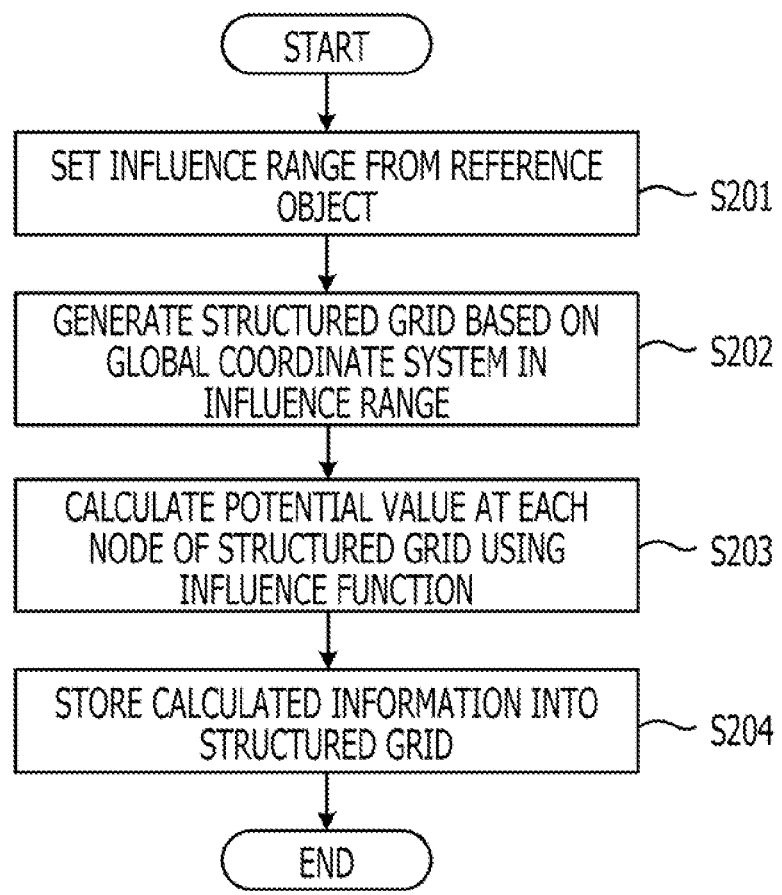
FIG. 6 illustrates an example flowchart of a local coordinate system generating process.

FIG. 6 illustrates an example flowchart of a local coordinate system generating process. First, the coordinate system generation unit 110 sets an influence range from a reference object (S201). The influence range is a range indicating that a local coordinate system is generated so as to cover a domain which is separated from around the reference object by an amount. An initial value of the influence range may be set in advance or it may be arbitrarily set via the input device 200. Then, the coordinate system generation unit 110 generates a structured grid based on a global coordinate system in the influence range (S202). The structured grid is a three-dimensional grid which is set around a reference object. The structured grid is generated so as to cover the influence range.

Next, the coordinate system generation unit 110 obtains a potential value at each node (a grid point) of the structured grid by using an influence function for the reference object (S203). The potential value is a value which is calculated according to the distance from the reference object. For example, the potential value "1" is obtained at a position which is the nearest the reference object and the value approaches "0" as the node goes away from the reference object and is reduced to "0" at an extension of the influence range. Then, the coordinate system generation unit 110 stores the calculated potential value into each node of the structured grid (S204).

Figure 7:
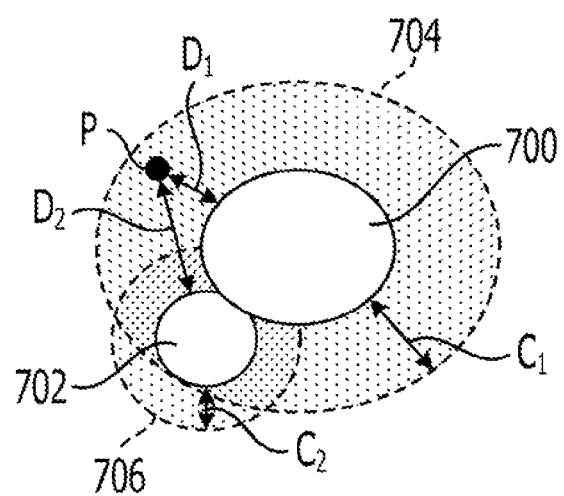
FIG. 7 illustrates an example of calculation of a potential value using an influence function.

Next, calculation of a potential value using an influence function will be described. FIG. 7 illustrates an example of calculation of a potential value using an influence function. FIG. 7 illustrates an example of calculating a potential value at a certain point P around two reference objects 700 and 702. A potential value $\phi_1$ for the reference object 700 at the point P is obtained by the following numerical formula 1 by using an influence function $f_1$ for the reference object 700. [Numerical Formula 1] $\phi_1=f_1(x, y, z)=(D_1-C_1)^2/D_1$ wherein $D_1$ is a minimum Euclidean distance between the point P and the reference object 700, and $C_1$ is a distance between the reference object 700 and an extension 704 of the influence range for the reference object 700. However, when $D_1>C_1$, $f_1$ is reduced to "0".

A potential value $\phi_2$ for the reference object 702 at the point P is obtained by the following numerical formula 2 by using an influence function $f_2$ for the reference object 702. [Numerical Formula 2] $\phi_2=f_2(x, y, z)=(D_2-C_2)^2/D_2$ wherein $D_2$ is a minimum Euclidean distance between the point P and the reference object 702, and $C_2$ is a distance between the reference object 702 and an extension 706 of the influence range for the reference object 702. However, when $D_2>C_2$, $f_2$ is reduced to "0".

Then, a potential value $\phi$ at the point P is obtained by the following numerical formula 3 by using an influence function f for the reference object 700 and the reference object 702. [Numerical Formula 3] $\phi=f(x, y, z)=f_1(x, y, z)+f_2(x, y, z)$. It may become possible to generate a smooth isosurface coping with even a reference object of a complicated form by obtaining the potential value from the sum of influence functions as described in this embodiment. Incidentally, any influence function may be adopted as long as it is a decay function with which the potential value is reduced as the distance between the point P and the reference object approaches the distance up to the extension of the influence range. For example, a fast marching method of generating a potential value according to a distance from a reference object may be used. The fast marching method is a method of obtaining an interface which is a phase-changeable dynamic profile model and is at a certain time t in a density distribution space. (see J. A. Sethian, Level set method and fast marching method, Cambridge University Press (1999)).

Figure 8:
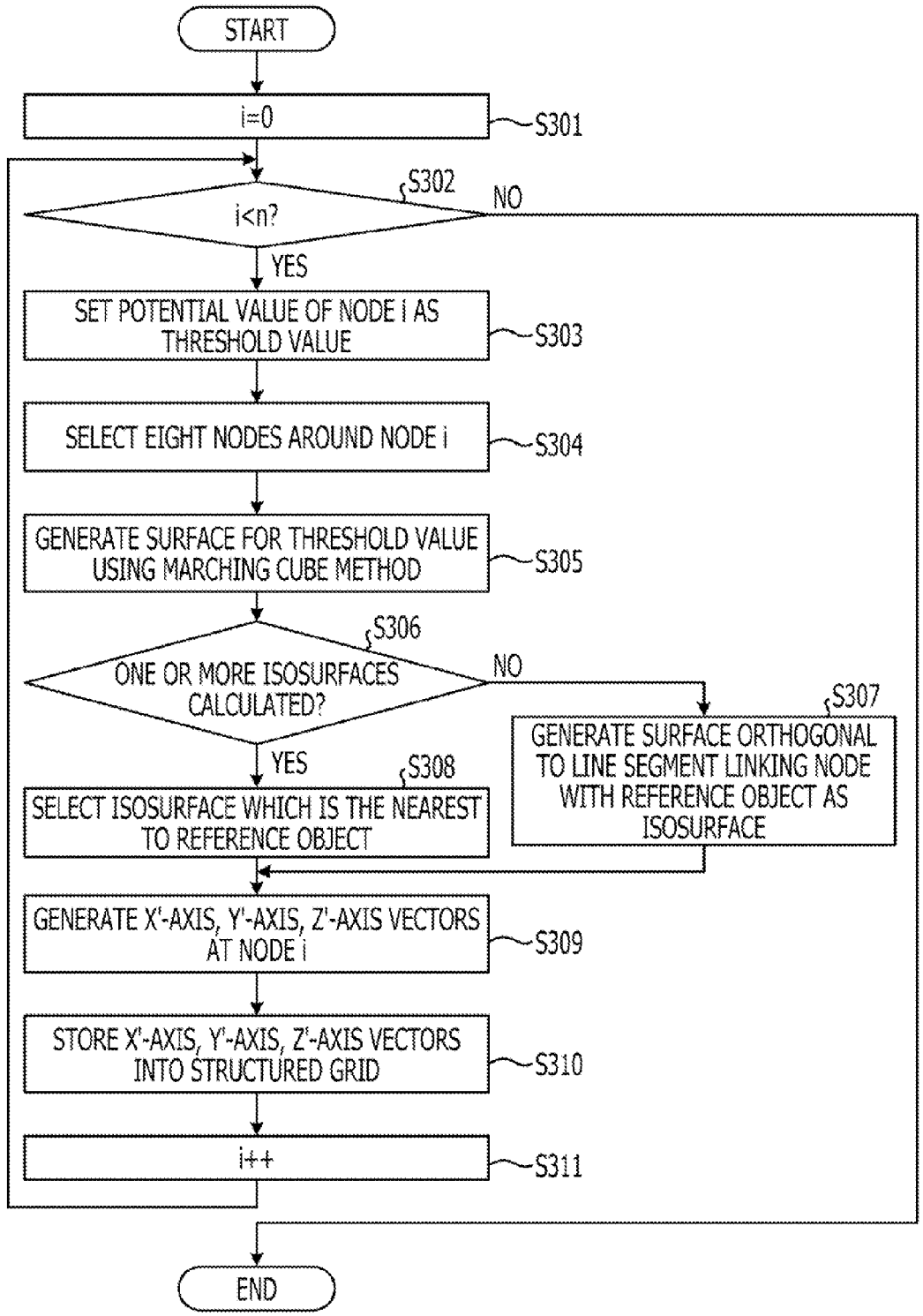
FIG. 8 illustrates an example flowchart of a local coordinate system calculating process.

Next, generation of a local coordinate system will be described. FIG. 8 illustrates an example flowchart of a process of calculating a local coordinate system. The coordinate system generation unit 110 generates a local coordinate system for each of n nodes (grid points) of a structured grid. For this purpose, the coordinate system generation unit 110 first initializes a variable i for performing looping n times to "0" (S301). Then, the coordinate system generation unit 110 judges whether i<n (S302). When i<n (Yes at S302), that is, when all the n nodes of the structured grid are not yet processed, the coordinate system generation unit 110 sets the potential value of the node i of the structured grid as a threshold value (S303). Next, the coordinate system generation unit 110 selects eight nodes around the node i (S304). Then, the coordinate system generation unit 110 generates a surface for the threshold value using a marching cube method. As a result, an isosurface that links together the nodes of the equal potential values of the structured grid is formed.

However, for example, when the potential value of a certain node is different from the potential value of any one of the surrounding eight nodes, the isosurface is not generated. Thus, the coordinate system generation unit 110 judges whether one or more isosurfaces have been calculated (S306). When any isosurface is not calculated (No at S306), the coordinate system generation unit 110 generates a surface which is orthogonal to a line segment that links the node concerned with the reference object with a shortest distance as an isosurface (S307).

On the other hand, since a plurality of isosurfaces are generated depending on a node in some cases, when one or more isosurfaces have been calculated (Yes at S306), the coordinate system generation unit 110 selects an isosurface which is the nearest to the reference object (S308). Then, the coordinate system generation unit 110 generates an X'-axis vector, a Y'-axis vector and a Z'-axis vector based on a first axis which is orthogonal to the isosurface, and second and third axes which are orthogonal to each other on the isosurface (S309). Specifically, the coordinate system generation unit 110 sets the first axis orthogonal to the isosurface as the Z'-axis vector. In addition, the coordinate system generation unit 110 sets a direction of an intersection between an X-Y plane and the isosurface in a global coordinate system as the X'-axis vector. Further, the coordinate system generation unit 110 sets a direction orthogonal to the X'-axis on the isosurface as the Y'-axis vector. In the following explanation, the global coordinate system will be called the X-axis, Y-axis and Z-axis and the local coordinate system will be called the X'-axis, Y'-axis and Z'-axis in order to distinguish the global coordinate system from the local coordinate system.

Next, the coordinate system generation unit 110 stores the X'-axis, Y'-axis and Z'-axis vectors at the node i into the structured grid (S310). Then, the coordinate system generation unit 110 increments i (S311) and returns to S302 to perform a process for the next node of the structured grid. When i<n is not established at S302 (No at S302), that is, all the n nodes of the structured grid have been processed, the coordinate system generation unit 110 terminates execution of the process. As a result, the X'-axis, Y'-axis and Z'-axis vectors are stored into each of the plurality of nodes of the structured grid.

Figure 9:
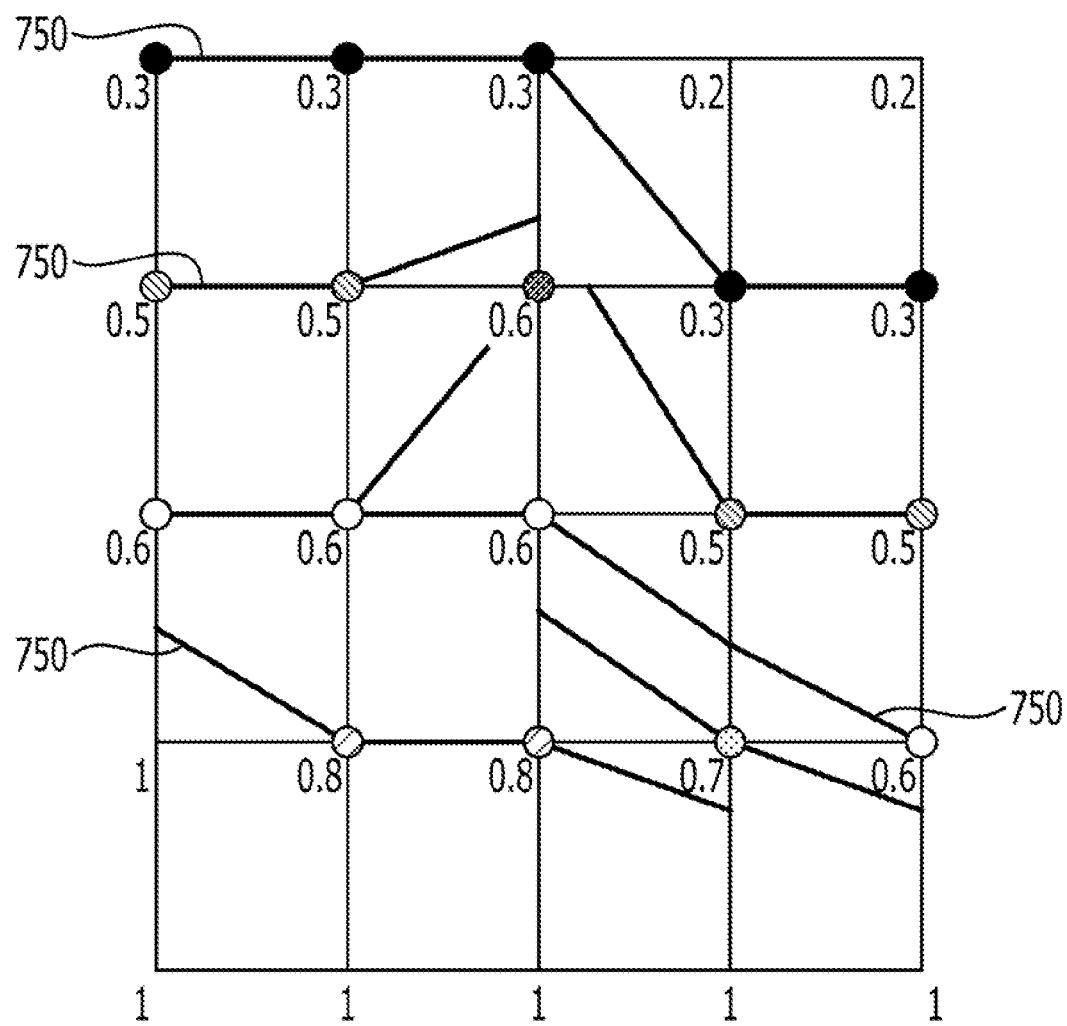
FIG. 9 illustrates an example of potential values and isosurfaces on a structured grid.

FIG. 9 illustrates an example of potential values and isosurfaces on a structured grid. FIG. 9 illustrates an X-Y plane in the global coordinate system of a structured grid. As illustrated in FIG. 9, potential values such as, for example, "0.3", "0.5", "1" and the like are stored into the respective nodes on the structured grid. Then, an isosurface 750 is generated by linking nodes of equal potential values with each other. Here, since the isosurface 750 is generated for each node, a continuous surface need not necessarily be generated.

Figure 10:
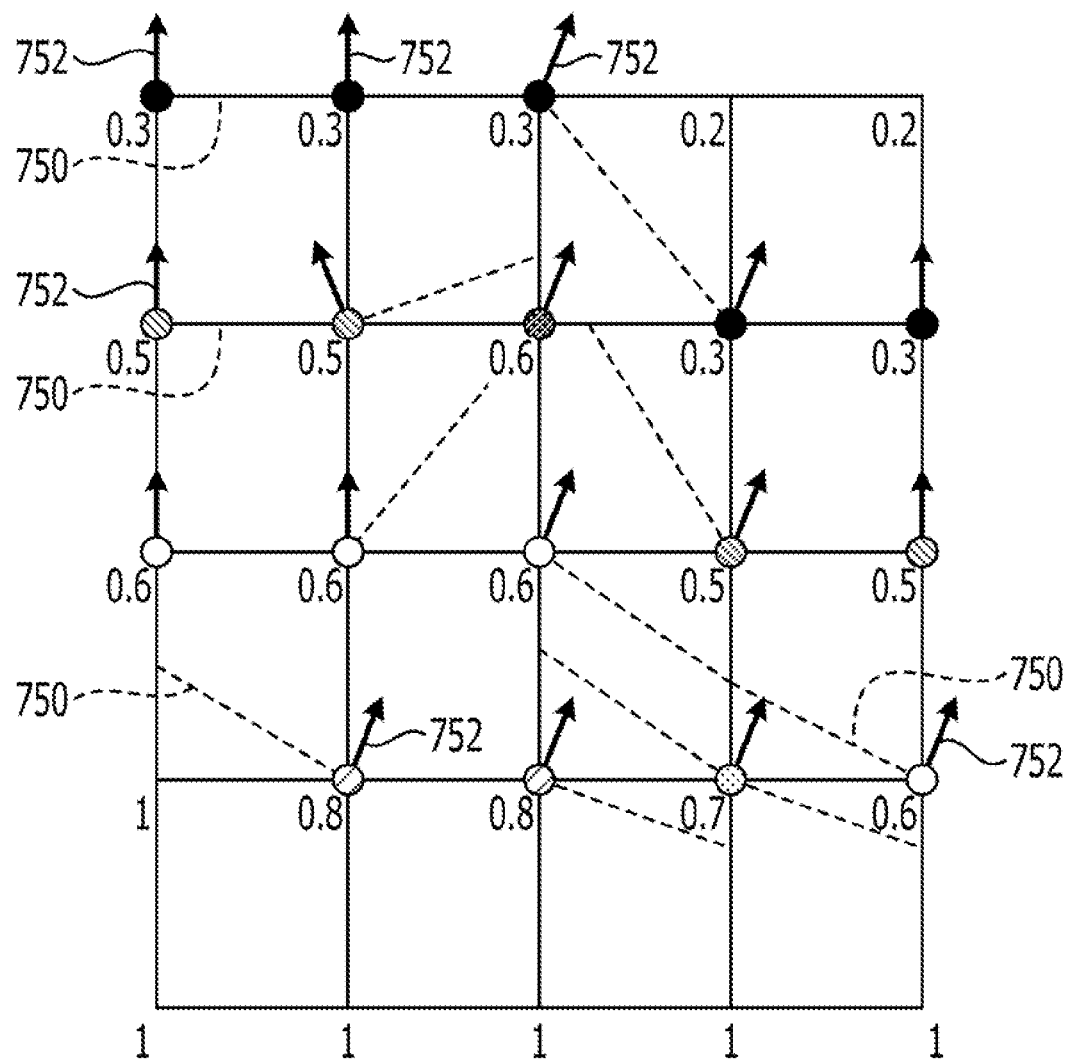
FIG. 10 illustrates an example of calculation of a Z'-axis vector at each point on a structured grid.
Figure 11:
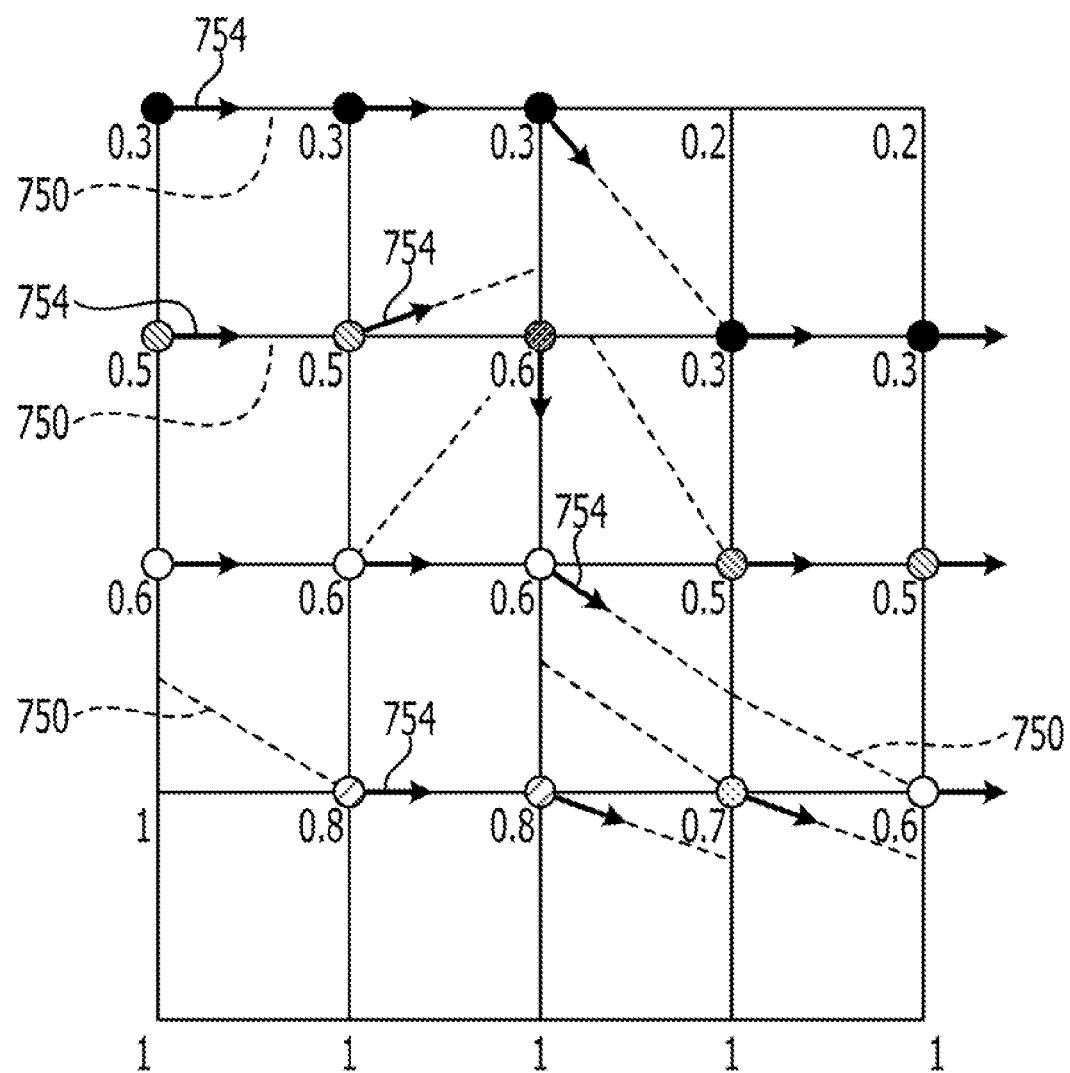
FIG. 11 illustrates an example of calculation of an X'-axis vector at each point on a structured grid.

FIG. 10 illustrates an example of a calculation of a Z'-axis vector at each point on a structured grid and FIG. 11 illustrates an example of a calculation of an X'-axis vector at each point on a structured grid. As illustrated in FIG. 10, a Z'-axis vector 752 is generated in a direction orthogonal to the isosurface 750 for each node of the structured grid. Then, as illustrated in FIG. 11, an X'-axis vector 754 is generated in a direction of an intersection between the isosurface 750 and the X-Y plane in the global coordinate system. Incidentally, the Y'-axis vector is generated in a direction orthogonal to the X'-axis vector on the isosurface 750.

Figure 12:
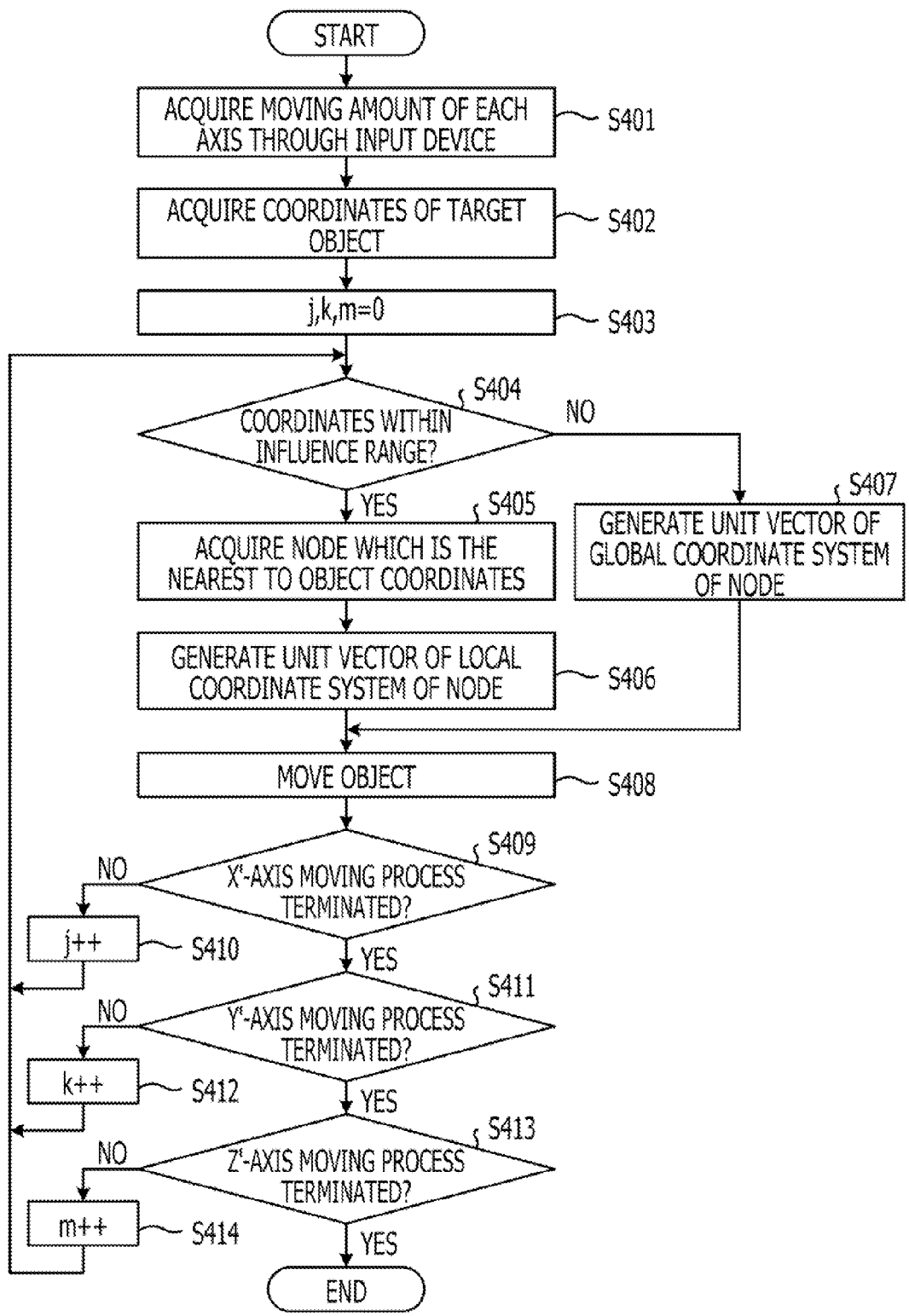
FIG. 12 illustrates an example flowchart of a process of calculating the coordinates of a move destination of a target object.

FIG. 12 illustrates an example flowchart of a process of calculating coordinates of a move destination of a target object. First, the move destination coordinates calculation unit 112 acquires a moving amount for each of the X'-axis, the Y'-axis and the Z'-axis through the input device 200 (S401). Then, the move destination coordinates calculation unit 112 acquires the current coordinates of a target object (S402). Then, the move destination coordinates calculation unit 112 executes the following moving process in order of the X'-axis, the Y'-axis and the Z'-axis. For this purpose, the move destination coordinates calculation unit 112 initializes each of a variable j for looping the X'-axis, a variable k for looping the Y'-axis and a variable m for looping the Z'-axis to "0" (S403).

Then, the move destination coordinates calculation unit 112 judges whether the coordinates of the operated object are within an influence range (S404). When the coordinates of the operated object are within the influence range (Yes at S404), the move destination coordinates calculation unit 112 acquires a node of the structured grid which is the nearest to the coordinates of the operated object (S405). Since the operated object may not be positioned on the node of the structured grid in some cases, the nearest node of the structured grid is acquired. If the operated object is positioned on a node of the structured grid, the node of the structured grid on which the operated object is positioned will be acquired.

Then, the move destination coordinates calculation unit 112 generates a unit vector of a local coordinate system of the acquired node of the structured grid (S406). Specifically, the move destination coordinates calculation unit 112 generates the unit vector oriented in the direction of the X'-axis vector of the local coordinate system. On the other hand, when the coordinates of the operated object are not within the influence range at S404 (No at S404), since the operated object is positioned at a place deviating from the structured grid and any local coordinate system is not present, the move destination coordinates calculation unit 112 generates the unit vector of the global coordinate system (S407). Specifically, the move destination coordinates calculation unit 112 generates the unit vector oriented in the direction of the X-axis vector of the global coordinate system. Then, the moving process unit 114 moves the operated object according to the unit vector generated at S406 or S407 (S408).

Next, the move destination coordinates calculation unit 112 judges whether execution of an X'-axis moving process has been terminated (S409). Specifically, when the variable j has become larger than the amount of movement in the X'-axis direction, the move destination coordinates calculation unit 112 judges that execution of the X'-axis moving process has been terminated. When execution of the X'-axis moving process is not terminated (No at S409), the move destination coordinates calculation unit 112 increments j (S410) and returns to S404. That is, the move destination coordinates calculation unit 112 does not move the operated object far at one time and moves again and again the operated object by the amount corresponding to the unit vector each time until execution of the X'-axis moving process is terminated.

When execution of the X'-axis moving process has been terminated (Yes at S409), the move destination coordinates calculation unit 112 judges whether execution of a Y'-axis moving process has been terminated (S411). When execution of the Y'-axis moving process is not terminated (No at S411), the move destination coordinates calculation unit 112 increments k (S412), returns to S404 and executes again the processes at S404 to S408.

When execution of the Y'-axis moving process has been terminated (Yes at S411), the move destination coordinates calculation unit 112 judges whether execution of a Z'-axis moving process has been terminated (S413). When execution of the Z'-axis moving process is not terminated (No at S413), the move destination coordinates calculation unit 112 increments m (S414), returns to S404 and executes again the processes at S404 to S408 as in the case of the X'-axis moving process. When execution of the Z'-axis moving process has been terminated (Yes at S413), the move destination coordinates calculation unit 112 terminates execution of the operated object moving process. Owing to the above mentioned operations, it may become possible to move three-dimensionally the operated object to an arbitrary position by a simple operation. In addition, for example, when a Z'-axis directed to go away from a reference object is supposed to be positive, the sight line direction of the virtual camera which is the operated object may be set to the negative direction of the Z'-axis. As a result, since the sight line of the virtual camera is generally directed toward the reference object regardless of three-dimensional movement of the virtual camera to an arbitrary position, it may become possible to generally obtain an observed image of the reference object while moving the virtual camera three-dimensionally. In addition, the sight line direction of the virtual camera is not fixed to a certain direction and may be arbitrarily set.

Figure 13:
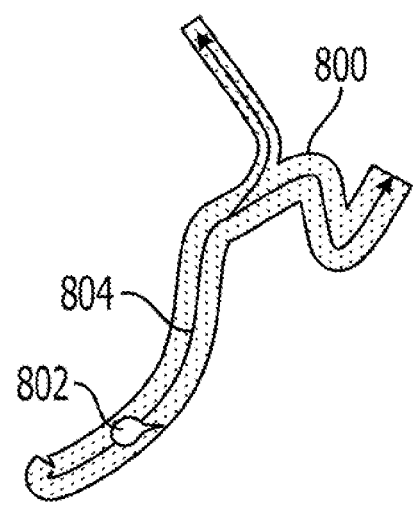
FIG. 13 illustrates an example of a virtual organ and a virtual endoscope.

Next, an embodiment in which a virtual organ is a reference object and a virtual endoscope is a target object will be described. FIG. 13 illustrates an example of a virtual organ and a virtual endoscope. In a virtual endoscopic technique, tubular data on a blood vessel or the large intestine of a subject is imaged by a medical imaging device such as a CT (Computed Tomography) device or an MRI (Magnetic Resonance Imaging) device. Then, in the virtual endoscopic technique, an inner wall surface or the like of a blood vessel or the large intestine that a virtual endoscope 802 takes in its sight line direction is observed while operating the virtual endoscope 802 to move along a central axis 804 passing through, for example, the center of a tube within a virtual organ 800 which is the tubular data as illustrated in FIG. 13. In the virtual endoscopic technique, since the virtual endoscope 802 which is the target object walks through along a fine tube of a blood vessel or the large intestine, it may be desirable to operate the target object simply and highly freely.

Figure 14:
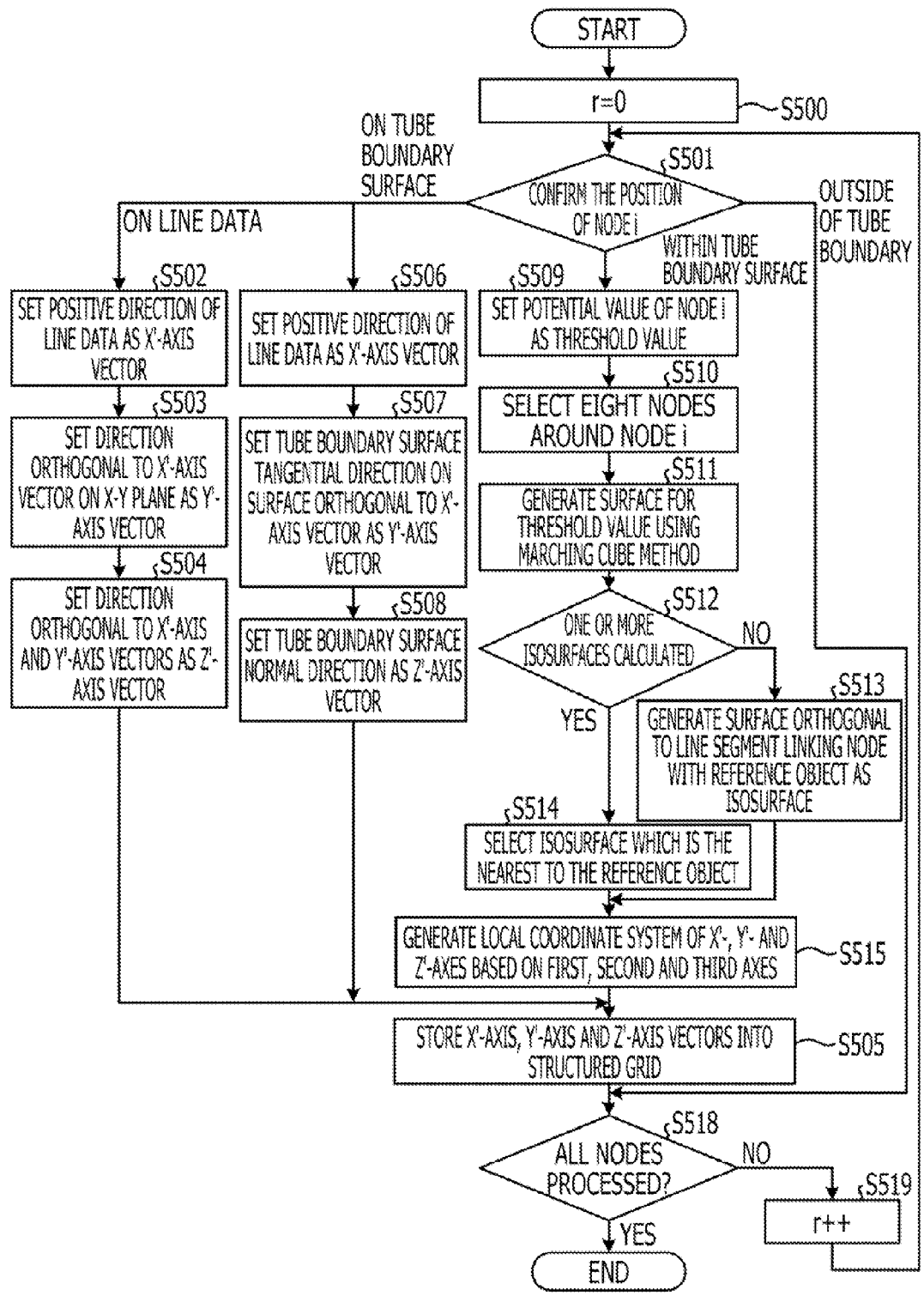
FIG. 14 illustrates an example flowchart of a local coordinate system calculating process when a reference object is line data.

FIG. 14 is an example flowchart of a local coordinate system calculating process executed when the reference object is line data. In the virtual endoscopic technique, the virtual endoscope 802 is operated to move three-dimensionally not around the virtual organ 800 but within the virtual organ 800. Thus, when the virtual endoscope 802 has been selected as the target object and the virtual organ 800 has been selected as the reference object at S101 and S102 in FIG. 5, the object setting unit 115 sets the line data passing through the tube center of the virtual organ 800 as the reference object. The potential value of each of nodes of a structured grid is obtained and stored into each node as in the case of the processes at S201 to S204 in FIG. 6.

The coordinate system generation unit 110 generates a local coordinate system for each of n nodes of the structured grid. For this purpose, first, the coordinate system generation unit 110 initializes a variable r for performing looping n times to "0" (S500). Then, the coordinate system generation unit 110 confirms whether a node i of the structured grid is positioned on the line data, on a tube boundary surface, in the tube boundary surface, or on the outside of the tube boundary (S501). When the node i is positioned on the line data, the coordinate system generation unit 110 sets the positive direction of the Line Data as the X'-axis vector (S502). Then, the coordinate system generation unit 110 sets a direction orthogonal to the X'-axis vector on the X-Y plane of a global coordinate system as the Y'-axis vector (S503). Then, the coordinate system generation unit 110 sets a direction orthogonal to both the X'-axis vector and the Y'-axis vector as the Z'-axis vector (S504). Then, the coordinate system generation unit 110 stores the set X'-axis, Y'-axis and Z'-axis vectors into the corresponding node of the structured grid (S505).

When the node i is positioned on the tube boundary surface, the coordinate system generation unit 110 sets the positive direction of the line data as the X'-axis vector (S506). Then, the coordinate system generation unit 110 sets a tangential direction of the tube boundary surface on an orthogonal surface orthogonal to the X'-axis vector as the Y'-axis vector (S507). Then, the coordinate system generation unit 110 sets a normal direction of the tube boundary surface as the Z'-axis vector (S508). Then, the coordinate system generation unit 110 stores the set X'-axis, Y'-axis and Z'-axis vectors into the corresponding node of the structured grid (S505).

When the node i is positioned in the tube boundary surface, the coordinate system generation unit 110 sets the potential value of the node i as a threshold value (S509). Then, the coordinate system generation unit 110 selects eight nodes around the node i (S510). Then, the coordinate system generation unit 110 generates a surface for the threshold value using a marching cube method (S511). As a result, an isosurface that links together respective nodes having equal potential values of the structure grid is formed.

However, for example, if the potential value of a certain node is different from the potential values of eight nodes around it, any isosurface will not be formed. Thus, the coordinate system generation unit 110 judges whether one or more isosurfaces have been calculated (S512). When any isosurface is not calculated (No at S512), the coordinate system generation unit 110 generates a surface orthogonal to a line segment that links the node with the reference object with a shortest distance as the isosurface (S513).

On the other hand, since a plurality of isosurfaces are generated depending on a node in some cases, when one or more isosurfaces have been calculated (Yes at S512), the coordinate system generation unit 110 selects an isosurface which is the nearest to the reference object (S514). Then, the coordinate system generation unit 110 generates the local coordinate system of the X'-, Y'- and Z'-axes based on the first axis orthogonal to the isosurface and the second and third axes which are orthogonal to each other on the isosurface (S515). Specifically, the coordinate system generation unit 110 sets the first axis orthogonal to the isosurface as the Z'-axis vector. In addition, the coordinate system generation unit 110 sets a direction of an intersection between the X-Y plane and the isosurface in the global coordinate system as the X'-axis vector. Further, the coordinate system generation unit 110 sets a direction which is orthogonal to the X'-axis on the isosurface as the Y'-axis vector. Then, the coordinate system generation unit 110 stores the set X'-axis, Y'-axis and Z'-axis vectors into the corresponding node of the structured grid (S505).

On the other hand, when the node i is positioned on the outside of the tube boundary, the coordinate system generation unit 110 does not generate the local coordinate system and executes succeeding processes. The coordinate system generation unit 110 judges whether execution of the local coordinate system generating process for all the nodes of the structured grid has been terminated (S518). Specifically, the coordinate system generation unit 110 judges whether r<n. When execution of the local coordinate system generating process for all the nodes of the structured grid is not terminated (No at S518), the coordinate system generation unit 110 increments r (S519) and returns to S501. On the other hand, when execution of the local coordinate system generating process for all the nodes of the structured grid has been terminated (Yes at S518), the coordinate system generation unit 110 terminates execution of the local coordinate system generating process.

Figure 15:
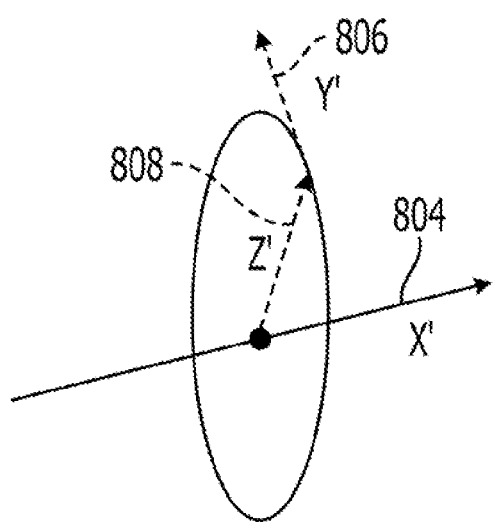
FIG. 15 illustrates an example of a local coordinate system when a reference object is line data.

FIG. 15 illustrates an example of a local coordinate system when the reference object is line data. As illustrated in FIG. 15, a direction along the line data is set as an X'-axis vector 804 for a node other than a node which is present on the line data and a node which is present on the outside of the tube boundary in nodes of a structured grid. In addition, a direction that the target object goes away from the line data on an orthogonal surface orthogonal to the X'-axis vector is set as a Z'-axis vector 808. A direction that the target object rotates around the line data on the orthogonal surface is set as a Y'-axis vector 806.

Next, a process of calculating the coordinates of a move destination of a virtual endoscope will be described. FIG. 16 illustrates an example flowchart of a process of calculating the coordinates of a move destination of a virtual endoscope. First, the move destination coordinates calculation unit 112 acquires a moving amount for each of the X'-axis, Y'-axis and Z'-axis through the input device 200 (S601). Then, the move destination coordinates calculation unit 112 acquires the current coordinates of the target object (the endoscope 802) (S602). The move destination coordinates calculation unit 112 initializes each of a variable s for looping the X'-axis, a variable u for looping the Y'-axis and a variable v for looping the Z'-axis to "0" in order to execute the following moving process in order of the X'-axis, the Y'-axis and the Z'-axis (S603).

Then, the move destination coordinates calculation unit 112 judges whether the coordinates of the target object are within a tube boundary surface (S604). When the coordinates of the target object are within the tube boundary surface (Yes at S604), the move destination coordinates calculation unit 112 acquires a node of the structured grid which is the nearest to the coordinates of the target object (S605). Since the target object may not be positioned on the node of the structured grid in some cases, the node of the structured grid which is the nearest the coordinates is acquired. If the target object is positioned on a node of the structured grid, the node of the structured grid on which the target object is positioned will be acquired.

Next, the move destination coordinates calculation unit 112 generates a unit vector of the local coordinate system of the acquired node of the structured grid (S606). On the other hand, when the coordinates of the target object are not within the tube boundary surface (No at S604), the move destination coordinates calculation unit 112 generates the unit vector in the direction of the X'-axis vector of the local coordinate system at the node of the structured grid as for the X'-axis vector (S607). Then, the moving process unit 114 moves the target object according to the unit vector generated at S606 or S607 (S608). That is, the move destination coordinates calculation unit 112 calculates the coordinates of the move destination of the target object based on the local coordinate system set for each node of the structured grid, and the moving process unit 114 moves the target object based on the calculated move destination coordinates.

Next, the move destination coordinate calculation unit 112 judges whether execution of the X'-axis moving process has been terminated (S609). Specifically, when s has became larger than the amount of movement in the X'-axis direction, the move destination coordinates calculation unit 112 judges that execution of the X'-axis moving process has been terminated. When execution of the X'-axis moving process is not terminated (No at S609), the move destination coordinates calculation unit 112 increments s (S610) and returns to S604. That is, the move destination coordinate calculation unit 112 does not move the target object far at one time and moves again and again the target object by the amount corresponding to the unit vector each time until execution of the X'-axis moving process has been terminated.

When execution of the X'-axis moving process has been terminated (Yes at S609), the move destination coordinates calculation unit 112 judges whether execution of a Y'-axis moving process has been terminated (S611). When execution of the Y'-axis moving process is not terminated (No at S611), the move destination coordinates calculation unit 112 increments u (S612), returns to S604 and executes again the processes at S604 to S608 as in the case of the X'-axis moving process.

When execution of the Y'-axis moving process has been terminated (Yes at S611), the move destination coordinates calculation unit 112 judges whether a Z'-axis moving process has been executed (S613). When execution of the Z'-axis moving process is not terminated (No at S613), the move destination coordinates calculation unit 112 increments V (S614), returns to S604, and executes again the processes at S604 to S608 as in the case of the X'-axis moving process. However, in the Z'-axis moving process, the process at S607 is different from the processes for the X'-axis and the Y'-axis. That is, when the coordinates of the target object are not within the tube boundary surface at S604 and when the amount of movement in the Z'-axis direction is positive, the move destination coordinates calculation unit 112 reduces the moving amount to "0" in order to prevent the target object from going away from the tube which is the virtual organ 800 due to positive movement in the Z'-axis direction. When the coordinates of the target object are not within the tube boundary surface and the amount of movement in the Z'-axis direction is negative, the move destination coordinates calculation unit 112 retains the moving amount (the negative moving amount) as it is in order to move the target object in a direction that it approaches the tube. When execution of the Z'-axis moving process has been terminated (Yes at S613), the move destination coordinates calculation unit 112 terminates execution of the target object moving process.

As described above, the object operation device according to the embodiment generates a local coordinate system for each of a plurality of points which are set around a reference object and moves a target object three-dimensionally based on the local coordinate system of each point. Therefore, according to the object operation device of the embodiment, since it may not be necessary to operate the target object on two screens, it may become possible to simply operate the target object to move three-dimensionally. In addition, according to the object operation device of the embodiment, since a path along which the target object moves is not set in advance and the local coordinate system of each of the plurality of points around the reference object is generated instead, it may become possible to move the target object three-dimensionally to an arbitrary position.

In addition, the object operation device of the embodiment generates the local coordinate system based on the first axis which is orthogonal to the isosurface which has been formed based on the potential value of each of the plurality of points around the reference object, and the second and third axes which are orthogonal to each other on the isosurface. That is, the first axis is the axis directed such that the target object comes near or goes away from the reference object and the second and third axes are axes along which the target object moves on a surface separated from the reference object with a fixed distance. Therefore, according to the object operation device of the embodiment, it may become possible to observe the reference object from various directions while moving the target object such as the virtual camera or the like on a surface separated from the reference object with a fixed distance. In addition, it may become also possible to observe in details a specific part of the reference object or to observe the entire of the reference object while moving the target object in a direction it comes near or goes away from the reference object.

When the reference object is line data, the object operation device of the embodiment generates a local coordinate system for each of a plurality of points around the reference object based on a first axis directed along the line data, a second axis directed such that the target object goes away from the line data on an orthogonal surface which is orthogonal to the line data, and a third axis directed such that the target object rotates around the line data on the orthogonal surface. Therefore, according to the object operation device of the embodiment, when a virtual endoscope is to be moved three-dimensionally within tubular data, for example, on a blood vessel, the large intestine or the like, it may become possible to simply and highly freely operate it to move three-dimensionally.

The object operation device of the embodiment converts a move command value in the local coordinate system of a target object which is input through the input device to a move command value in the global coordinate system and calculates the coordinates of a move destination of the target object based on the converted move command value. Therefore, according to the object operation device of the embodiment, it may become possible to operate the target object to move three-dimensionally by an intuitive operation.

Incidentally, although description has been made mainly in relation to the object operation device and the object operation method, the invention is not limited to the above and functions which are substantially the same as those in the above mentioned embodiments may be implemented by executing an object operation program that has been prepared in advance by a computer. That is, the object operation program makes a computer execute a process of generating a local coordinate system for each of a plurality of points set around a reference object which will be a reference in operating a target object to move three-dimensionally. In addition, the object operation program makes the computer execute a process of calculating the coordinates of a move destination of the target object corresponding to a move command value of the target object which is input through the input device, based on the local coordinate system of each of the plurality of points generated by executing the local coordinate system generating process. Further, the object operation program makes the computer execute a process of moving the target object to the move destination coordinates that has been calculated by executing the move destination coordinates calculating process. Incidentally, the object operation program may be distributed to a computer via a communication network such as Internet or the like. In addition, the object operation program may be stored in a memory which is built into a computer or in a computer-readable recording medium such as a hard disk and the like and may be read out of the recording medium by the computer to be executed.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An object operation device for operating an object displayed on a display device, the object operation device comprising:

a coordinate system generation unit that generates a plurality of local coordinate systems respectively corresponding to a plurality of points set around a reference object that is a reference of an operation when a target object is moved three-dimensionally by the operation;

a move destination coordinates calculation unit that calculates move destination coordinates of the target object corresponding to a first move command value of the target object inputted through an input device, based on a first local coordinate system corresponding to a first point that is nearest to a coordinate of the target object among the plurality of points; and a moving process unit that moves the target object to the calculated move destination coordinates, wherein the coordinate system generation unit obtains a potential value according to a distance from the reference object, and generates the local coordinate system for each of the plurality of points set in the form of a grid around the reference object, based on first, second, and third axes, the first axis being orthogonal to an isosurface formed by linking together the points having the equal potential values, the second and third axes being orthogonal to each other on the isosurface.

2. The object operation device according to claim 1, wherein when the reference object is line data, the coordinate system generation unit generates the local coordinate system for each of the plurality of points set in the form of a grid around the reference object, based on first, second, and third axes, the first axis being directed to run along the line data, the second axis being directed to go in a direction away from the line data on an orthogonal surface orthogonal to the line data, the third axis being directed to rotate around the line data on the orthogonal surface.

3. The object operation device according to claim 1, wherein the move destination coordinates calculation unit converts the first move command value, in the local coordinate system of the target object, inputted through the input device to a second move command value in a global coordinate system, and calculates the coordinates of the move destination of the target object based on the converted second move command value.

4. The object operation device according to claim 1, wherein
the grid is generated so as to cover an influence range.

5. An object operation method for operating an object displayed on a display device, the object operation method comprising:
generating a plurality of local coordinate systems respectively corresponding to a plurality of points set around a reference object that is a reference of an operation when a target object is moved three-dimensionally by the operation;
calculating move destination coordinates of the target object corresponding to a move command value of the target object inputted through an input device, based on the local coordinate system corresponding to a first point that is nearest to a coordinate of the target object among the plurality of points; and
moving the target object to the calculated move destination coordinates, wherein
the generating obtains a potential value according to a distance from the reference object and generates the local coordinate system for each of the plurality of points set in the form of a grid around the reference object based on first, second, and third axes, the first axis being orthogonal to an isosurface formed by linking together the points having the equal potential values, the second and third axes being orthogonal to each other on the isosurface.

6. The object generation method according to claim 5, wherein
when the reference object is line data, the generating generates the local coordinate system for each of the plurality of points set in the form of a grid around the reference object, based on first, second, and third axes, the first axis being directed to run along the line data, the second axis being directed to go in a direction away from the line data on an orthogonal surface orthogonal to the line data, the third axis being directed to rotate around the line data on the orthogonal surface.

7. The object operation method according to claim 5, wherein
the calculating converts the move command value in the local coordinate system of the target object inputted through the input device to a move command value in a global coordinate system and calculates the coordinates of the move destination of the target object based on the converted move command value.

8. A non-transitory computer readable storage medium that stores an object program causing a computer to perform a process of operating an object displayed on a display device, the process comprising:
generating a plurality of local coordinate systems respectively corresponding to a plurality of points set around a reference object that is a reference of an operation when a target object is moved three-dimensionally by the operation;
calculating move destination coordinates of the target object corresponding to a move command value of the target object inputted through an input device, based on the local coordinate system corresponding to a first point that is nearest to a coordinate of the target object among the plurality of points; and
moving the target object to the calculated move destination coordinates, wherein
the generating obtains a potential value according to a distance from the reference object and generates the local coordinate system for each of the plurality of points set in the form of a grid around the reference object based on first, second, and third axes, the first axis being orthogonal to an isosurface formed by linking together the points having the equal potential values, the second and third axes being orthogonal to each other on the isosurface.

9. The computer-readable storage medium according to claim 8, wherein
when the reference object is line data, the generating generates the local coordinate system for each of the plurality of points set in the form of a grid around the reference object, based on first, second, and third axes, the first axis being directed to run along the line data, the second axis being directed to go in a direction away from the line data on an orthogonal surface orthogonal to the line data, the third axis being directed to rotate around the line data on the orthogonal surface.

10. The computer-readable storage medium according to claim 8, wherein
the calculating converts the move command value in the local coordinate system of the target object inputted through the input device to a move command value in a global coordinate system and calculates the coordinates of the move destination of the target object based on the converted move command value.

* * * * *